Figure 3:
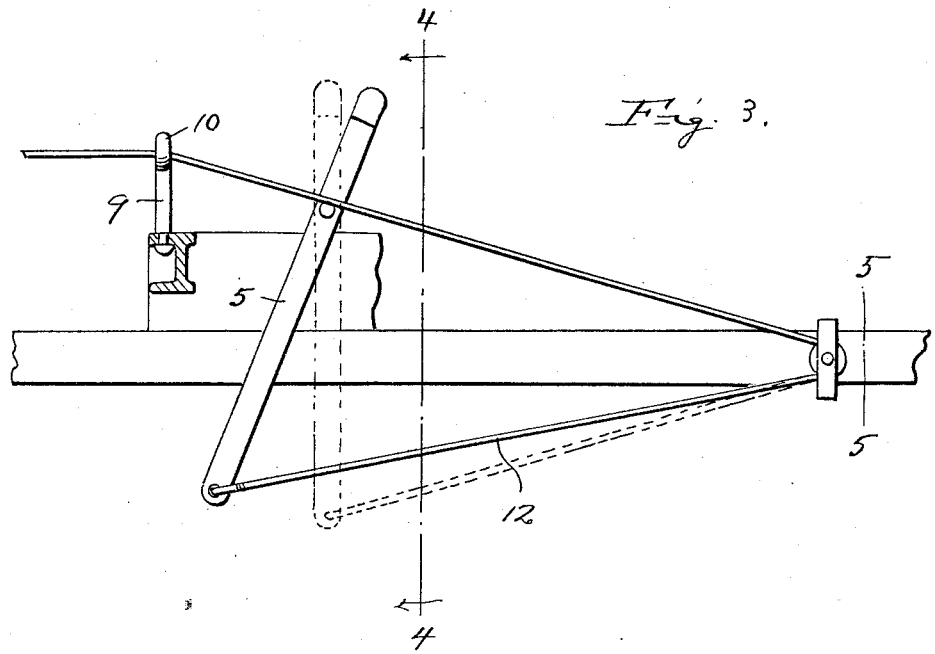

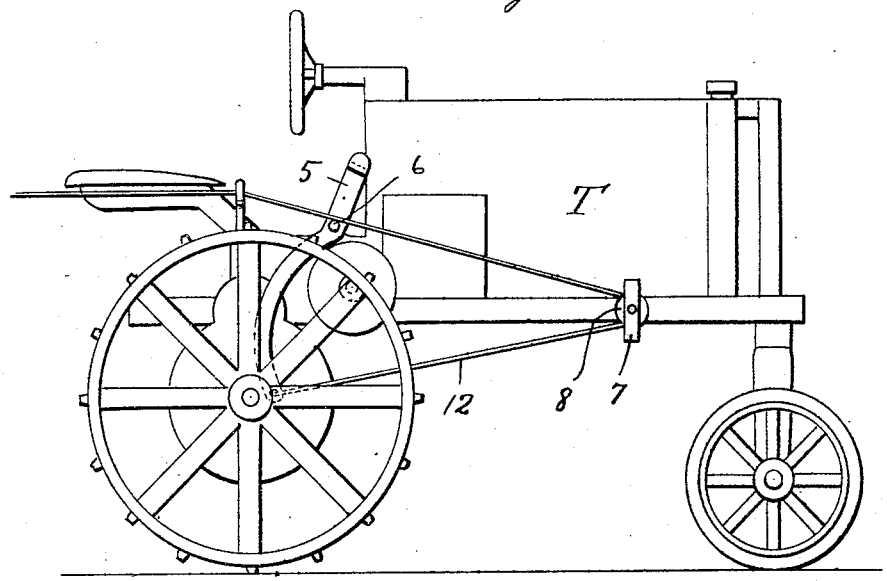
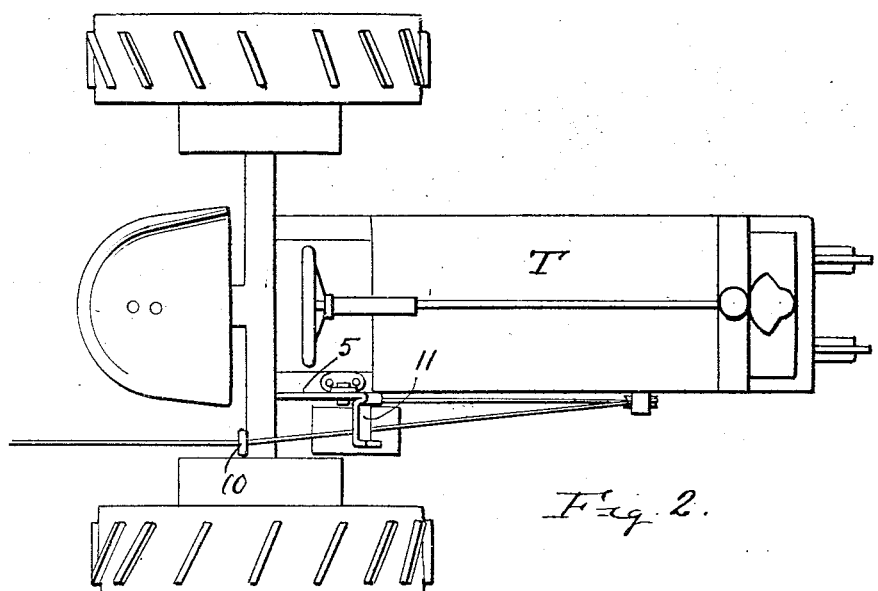

March 22, 1932. G. C. WHEELER 1,850,485
TRACTOR ATTACHMENT
Filed Jan. 29, 1930  2 Sheets-Sheet 2

Inventor
George C. Wheeler
By Clarence A O'Brien
Attorney

Patented Mar. 22, 1932

1,850,485

UNITED STATES PATENT OFFICE

GEORGE C. WHEELER, OF AINSWORTH, NEBRASKA

TRACTOR ATTACHMENT

Application filed January 29, 1930. Serial No. 424,293.

The present invention relates to an apparatus in the nature of an attachment for tractors and the prime object of the invention resides in the provision of an apparatus which may be used for manipulating different mechanisms on machines and the like trailing from the tractor.

Another very important object of the invention resides in the provision of an attachment apparatus of this nature which is exceedingly simple in its construction, inexpensive to manufacture, easy to apply, strong and durable, easy to manipulate, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 4:
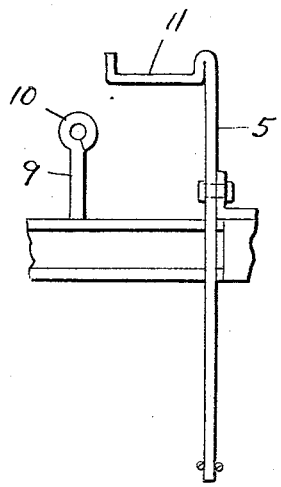
Figure 5:
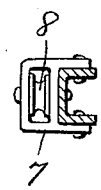

In the drawings:

Figure 1 is a side elevation of a tractor showing my attachment apparatus thereon, Figure 2 is a top plan view thereof, Figure 3 is a detail view of the apparatus, Figure 4 is a view taken substantially on the line 4—4 of Figure 3, Figure 5 is a detail sectional view taken substantially on the line 5—5 of Figure 3.

Referring to the drawings in detail it will be seen that the letter T denotes generally a tractor of any desired make on which is mounted a lever 5 suitably rockably mounted as at 6 in a convenient position such as to the right of the tractor a little forwardly of the driver's seat. The lower portion of this lever 5 may be curved as indicated in Figure 1, straight as is indicated in Figure 3 or any other suitable formation as may be necessary to accommodate peculiarities of the particular tractor on which the apparatus is mounted.

A bracket 7 is mounted on one side of the frame of the tractor forwardly thereof and has journalled therein a sleeve or pulley 8. A standard 9 is mounted on the rear of the tractor to the rear of the lever 5 and terminates in an eye 10. In the present embodiment of the invention the upper end of the lever 5 is bent so as to provide a substantially U-shaped foot plate 11 extending laterally from the lever.

A cable 12 is engaged with the bottom end of the lever, trained over the pulley 8 and through the eye 10 and extends back to the mechanism on the trailed machine or the like which is to be operated when the lever is actuated by the foot of the operator of the tractor.

This invention was primarily designed for operating the power lift on the drawn machine but may also be used for any lever on the drawn machine requiring a forward thrust, for example, tripping the bundle carrier on a binder or operating the cleaning devices on a disk harrow.

Obviously there are numerous other uses which the apparatus may be put.

The present embodiment of the invention has been disclosed merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A tractor attachment of the type described comprising a right angle bracket mounted upon the upper surface of one side member of the frame of a tractor, a foot lever pivoted intermediate its ends on the right angle bracket and within reach of the driver's seat of the tractor, a standard on the same side of the tractor as the right angle bracket and laterally outward therefrom on a cross member to the rear of the lever, a sheath mounted forwardly of the right angle bracket on the same side member of the tractor frame, a cable connected with the lower end of the lever and trained over the sheath and brought rearwardly and upwardly and through a guide eye on said standard to a connection with a machine drawn by the tractor, to operate certain devices thereon when a forward pressure is exerted on the upper end of the lever.

2. A tractor attachment of the type described comprising a right angle bracket mounted on a side member of the tractor frame a foot lever pivoted intermediate its ends on said bracket within reach of the driver's seat of the tractor, a standard on a rear cross member of the tractor frame rearwardly and laterally outwardly of the said bracket, a sheath mounted on the side member of the tractor frame forwardly of the lever, a cable connected with the lower end of the lever and trained over the sheath and brought rearwardly and upwardly and through a guide eye on the standard to be connected with a machine drawn by the tractor, whereby to operate the machine by a forward pressure on the upper end of the lever, said sheath having a U-shaped bracket embracing the side member of the tractor frame and having its legs secured thereto.

In testimony whereof I affix my signature.

GEORGE C. WHEELER.